Figure 1:
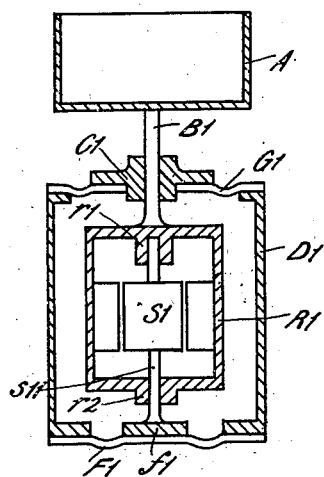

Aug. 7, 1928.                                             1,679,890
R. A. BALDWIN
MODE OF SUPPORTING AND JOURNALING MOTORS AND
HIGH SPEED SHAFTS DRIVEN THEREBY
Filed Sept. 14, 1927          2 Sheets-Sheet 1

Inventor
Robert A. Baldwin
By Spear, Middleton, Donaldson & Spear
Attys

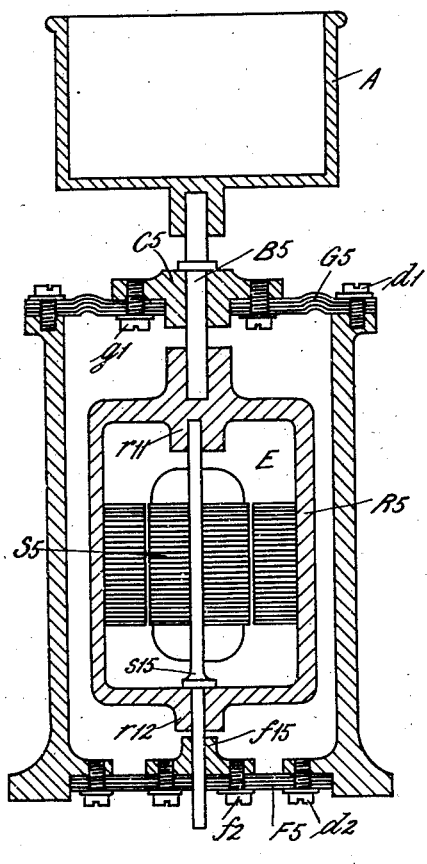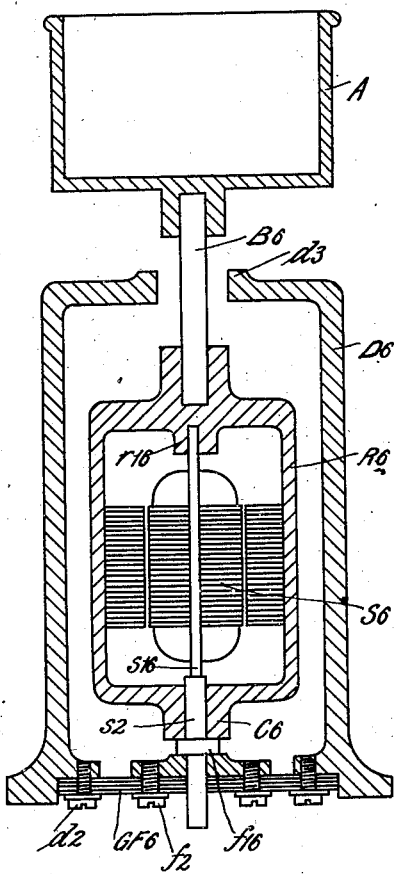

Patented Aug. 7, 1928.

1,679,890

UNITED STATES PATENT OFFICE.

ROBERT ALEXANDER BALDWIN, OF ASHTON-ON-MERSEY, ENGLAND.

MODE OF SUPPORTING AND JOURNALING MOTORS AND HIGH-SPEED SHAFTS DRIVEN THEREBY.

Application filed September 14, 1927, Serial No. 219,547, and in Great Britain July 9, 1926.

This invention relates to improvements in and in the mode of supporting and journaling motors and high speed shafts driven thereby, and is specially applicable to those cases in which the apparatus driven comprises a part the centre of gravity of which, by reason of unequal loading or the like, varies in position from time to time, as for example in centrifugal spinning apparatus employed in connection with the manufacture of artificial silk; and the object is to provide an improved arrangement of driving motor, whereby, with a high speed rotating mass having a variable centre of gravity, rotation takes place about an axis passing through the centre of gravity, so that vibration and consequent wear is practically eliminated.

According to the invention the main shaft has mounted on it, or has formed integral with it, the exteriorly disposed rotor member of the motor employed, and is directly connected to the mass to be rotated; and the interiorly disposed stator member of the motor is carried by suitable bearings from the rotor member or from the main shaft so that the stator and rotor are, for all positions of the shaft, held in true concentric relationship.

The main shaft with the rotor and stator thus connected, is so journaled that when the centre of gravity of the mass to be rotated does not coincide with the geometrical axis of the main shaft, rotation of the mass at high speeds can take place about an axis (usually a vertical axis) passing through the centre of gravity of the mass to be rotated, and intersecting the axis of the said shaft at a convenient point in relation to the motor, in which case the motion of the axis of the main shaft is one of circumduction, its locus being the surface of a cone the apex of which is at the said point of intersection, and the axis of which is the axis of rotation of the mass.

A self-aligning bearing for the main shaft is provided at or near that point in its length at which it is desired the apex of the said cone shall be located.

The interiorly disposed stator of course requires to be held against rotation due to the reaction of the driving torque, and it necessarily partakes of the motion of circumduction of the main shaft; the reaction torque is therefore so applied as to permit of this motion of the stator without undue restraint.

In the case of a centrifuge driven by an electromotor, which is usually situated below the driven vessel, the axis of the motor will tend to describe a cone, the approximate vertical axis of which will pass through the centre of gravity of the rotating mass; and according to the invention the weight of the rotating system is carried by a bearing, suitable to take the heavy stresses, and so supported that it is located at or near to the axis of the said cone, and is free to follow the motion of circumduction of the shaft, the rotating member and the stationary member of the motor being journaled together by relatively light bearings which, as they have not to support the main weight, may be made comparatively light and yet be sufficient to maintain without straining and with comparatively little friction the necessary concentricity of the said motor parts, and thus ensure high efficiency of motor performance, the device to take the torque reaction being flexible enough to do so without the introduction of objectionable stresses.

The rotor is the exteriorly located member of the motor, and it is made integral with or is fixed to the main shaft connected to the apparatus to be driven, the stator in this modification being journaled in any suitable manner in the rotor, and being held against rotation about the axis of the rotor by a torque applied as above described; preferably the stator is mounted on a shaft the opposite ends of which are journaled in bearings carried by the rotor or main shaft, the torque to take reaction of the driving torque being applied to the outer protruding end of the said shaft; or the stator may be mounted on a shaft forming a rigid extension of the main shaft and passing through the centre of the rotor, the reaction torque being applied, as described, to a sleeve extending from the outer end of the stator, which sleeve, to prevent flexure of the extension shaft, may be journaled in bearings carried from the rotor structure.

In the case of an electric motor the current would preferably be supplied to the stator and the rotor would be of the squirrel cage type. In the case of a turbine the operating fluid would be supplied to the stator.

The self-aligning bearing for the main shaft may be of any suitable and well-known type such as a bearing spherically seated in the fixed part of the apparatus, or it may be a bearing attached to the central part of a flexible diaphragm the peripheral portions of which are attached to the said fixed part, for example a rubber diaphragm.

The self-aligning bearing may be located between the motor and the apparatus to be rotated, or on the side of the motor remote from the said apparatus; and this bearing may be separate from the bearings by which the rotor and stator are held in concentric relationship, or may, in the case of an exteriorly located rotor or of an exteriorly located rotor, be combined with one of the two bearings between the rotor and stator, such bearings being either the one near to, or the one remote from the apparatus to be rotated.

The flexible means for applying the reaction torque to the stator may be separate from the said self-aligning bearing supporting means, and may be a spring or a flexible tube or a flexible diaphragm; or where the self-aligning bearing is combined with one of the bearings between the rotor and the stator, a flexible diaphragm may be arranged to support the bearing part attached to the stator so as to permit of universal movement, and also to provide the flexible means to transmit to the stator the torque necessary to hold it against rotation.

Where the self-aligning bearing is on the side of the motor remote from the apparatus to be driven, whether a separate self-aligning bearing or whether combined with the lower bearing between the rotor and the stator, the upper end of the shaft may pass out of the fixed structure in which the motor is mounted through a clearance hole, being supported circumferentially by means which when the apparatus is at rest, holds it in approximately vertical position, said supporting means however being so arranged that when the normal speed of rotation is reached the shaft rotates without contact with such supporting means.

I have illustrated my invention in the accompanying drawings which are diagrammatic in character, and do not illustrate the details of construction of the bearings which may be of any usual or suitable type such as journal and thrust ball bearings; any suitable type of motor, such as the high-speed small horse-power induction motors usually employed, or other motors such as turbines, may be used, provided that the rotor is exteriorly disposed, and that the main bearing by which the rotor is supported, and the bearings between the motor stator and rotor are arranged as described.

In the drawings, the invention is shown as applied to a small centrifuge for silk spinning, and each view is a diagrammatic elevation in conventional longitudinal section.

In the modifications illustrated in Figs. 1 and 5, the main bearing is located between the motor and the centrifuge vessel; in Figs. 2, 3, 4 and 6 the motor is located between the main bearing and the centrifuge vessel.

Figs. 5 and 6 illustrate the preferred arrangements.

Throughout the drawings;—A is the centrifuge vessel; B the main shaft which carries the vessel; C the main bearing which is of the universal self-aligning type; D the fixed frame from which the apparatus is carried; F the flexible means by which the stator is held against rotation; and E is the electro-motor, the stator or fixed part of which and rotor of which are respectively designated S and R; these letters being generally distinguished in the several figures by the addition of the numeral corresponding with the figure number.

Before referring to the preferred forms in detail, the more diagrammatic views, Figs. 1 to 4, will be briefly described as indicating generally suitable modifications of the arrangement in which the rotor of the motor is externally mounted.

Referring first to Fig. 1,—A is the centrifuge vessel mounted on the shaft $B'$ connected to the rotor $R'$ of the motor $E'$; the shaft $B'$ is carried in the main bearing $C'$ supported from the fixed casing $D'$ by a flexible member $G'$. The stator $S'$ is provided with a shaft $s^{11}$ journaled in bearings $r^1$ and $r^2$ in the rotor structure, the shaft protruding through the rotor and being connected to a flange $f^1$ connected by the flexible member $F'$ to the fixed casing D.

Figure 2:
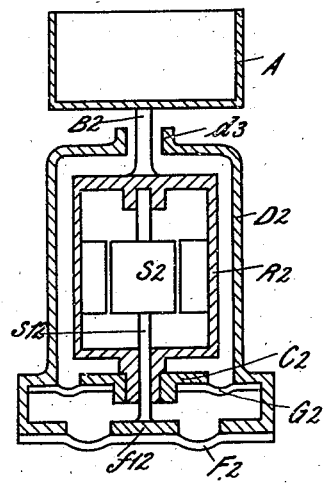

In Fig. 2 the arrangement is similar to Fig. 1 except that the main bearing $C^2$ is on the side of the motor remote from the vessel A, being supported from the fixed casing $D^2$ by the flexible member $G^2$, the shaft $s^{12}$ of the stator being connected to the flange $f^{12}$ which in turn is connected to the casing by the flexible member $F^2$. The shaft $B^2$ passes through an opening $d^3$ in the casing D, rotating clear of the said opening when in operation, and being supported by the walls of the said opening from undue lateral displacement when the apparatus is at rest.

Figure 3:
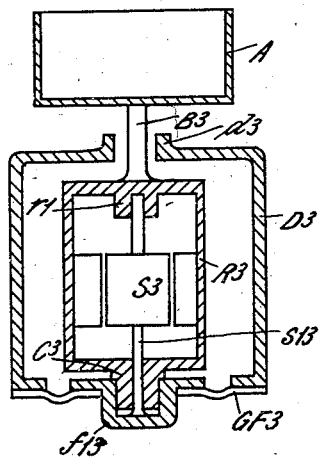

Fig. 3 is substantially similar to Fig. 2 except that the main bearing $C^3$ and the flange $f^{13}$ to which the stator shaft $s^{13}$ is attached are both carried by the same flexible member $GF^3$, which thus serves a double purpose.

Figure 4:
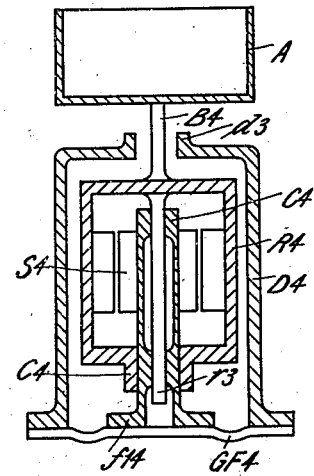

Fig. 4 is similar to Fig. 3 except that the stator $S^4$ is mounted on the sleeve $C^4$ which is journaled on a shaft $r^3$ forming part of the rotor structure, the sleeve $C^4$ being connected to the flange $f^{14}$ supported by the flexible member $GF^4$ which, as in Fig. 3, serves a double purpose of supporting the main sleeve $C^4$ and the torque resisting member $f^{14}$, in which case the bearing $C^4$ is a combined thrust and journal bearing. In each modification the stator shaft is in alignment with the main shaft.

Referring now to Fig. 5, which is the form shown more diagrammatically in Fig. 1;—

The centrifuge vessel A is carried by the shaft $B^5$ which is mounted in the main bearing $C^5$, which may be any suitable type of combined journal and thrust bearing, say a journal provided with journal and thrust ball races. The bearing $C^5$ is carried by the flexible member $G^5$ from the fixed frame or casing $D^5$ of the machine; the flexible member $G^5$ may consist of laminated or corrugated elastic discs or strips, such as rubber secured to the bearing by the screws $g^1$ and to the fixed casing $D^5$ by the screws $d^1$.

To the shaft $B^5$ is rigidly fixed the rotor $R^5$ of the electric motor $E^5$ so that the rotor and shaft rotate together; $S^5$ is the stator of the motor and $s^{15}$ the stator shaft; this shaft is carried in bearings $r^{11}$ and $r^{12}$ formed in the rotor structure, the stator and rotor being maintained by the said shaft and bearings in concentric relationship. The shaft $s^{15}$ extends through the bearing $r^{12}$ and is secured to a flange or coupling $f^{15}$ which is held against rotation relatively to the casing or frame $D^5$ by the torque resisting member $F^5$, which may consist of flexible discs or strips secured to the flange $f^1$ by the screws $f^2$, and to the fixed casing by the screws $d^2$.

The flexible member $F^5$ is so arranged as to permit of the angular and transverse movement of the flange $f^1$ but to prevent its rotation, the member $F^5$ therefore serving to take the reaction torque.

Assuming that the motor is energized and that rotation is imparted to the rotor $R^5$, it will be seen that if the centre of gravity of the load in the vessel A is not coincident with the common axis of the shafts $s^{15}$ and $B^5$, the rotation of the vessel A will take place about an axis passing through the centre of gravity and intersecting the common axis of the shafts $B^5$ and $s^{15}$, said common axis being free to take up a motion of circumduction about a cone surface preferably having its apex at or near the centre of the bearing $C^5$, the flexible support $G^5$ of the main bearing $C^5$ and the flexible torque resisting member $F^5$ permitting this movement to take place freely whilst true concentricity of running between the rotor $R^5$ and stator $S^5$ is ensured without subjecting the bearings $r^{11}$ and $r^{12}$ to undue stress.

Referring now to Fig. 6, which is substantially the arrangement illustrated more diagrammatically in Fig. 2;—the vessel A as before is attached to the shaft $B^6$ and the latter secured to the rotor $R^6$ of the motor $E^6$; the shaft $s^{16}$ of the stator $S^6$ is supported in bearings $r^{16}$ and $C^6$ formed in the rotor structure, and as before extends through the rotor and is attached to a flange $f^{16}$ carried by the flexible member $GF^6$, the latter, as before, being secured to the flange $f^{16}$ by the screws $f^{2'}$ and to the casing D by the screws $d^{2'}$. The shaft $B^6$ passes through an opening $d^3$ in the top of the fixed casing $D^6$ which opening is made sufficiently large to allow the shaft $B^6$, when the apparatus is running, to rotate freely, but serves to afford lateral support to the shaft $B^6$ when the apparatus is at rest, and the vessel A is being loaded.

The bearing $C^6$ is the main bearing and is equivalent to the bearing $C^5$ of Fig. 5 but instead of being located as in Fig. 5 between the motor and the vessel A it is located on the side of the motor remote from the vessel A; the shaft $s^{16}$ is, of course, fixed and it is enlarged as at $s^2$ so as to form a journal for the main bearing C, the latter bearing forming as in Fig. 5 a combined journal and thrust bearing and may conveniently comprise journal and thrust ball bearings.

In this case it will be seen that the flexible member $GF^6$, fulfills the double function of flexibly supporting the journal of the main bearing $C^6$ and forming the flexible member to take the torque reaction.

Should the centre of gravity of the loaded vessel A not lie on the combined common axis of the shafts $s^{16}$ and $B^6$, rotation at high speeds will take place about an axis passing through the centre of gravity and intersecting the common axis of the shafts $B^6$ and $s^{16}$, said common axis having a motion of circumduction about a cone, the apex of which preferably is at or near the centre of the bearing $C^6$.

In this arrangement therefore as in Fig. 5, the apparatus is capable of rotation at very high speeds without imparting vibration to the motor or to the casing $D^6$, the bearings between the rotor and the stator not being subjected to undue stress or vibration which permits a high efficient performance of the motor.

The motor may, when alternating current is available, conveniently be of induction type, the rotor having a squirrel cage winding so dispensing with running contacts.

Having now fully described my invention, I declare that what I claim and desire to secure by Letters Patent is:—

1. In combination, an inner fixed stator member, an outer rotor member, a frame surrounding and enclosing said stator and rotor members, a bearing for supporting said rotor and stator, and a flexible connection between said bearing and said frame, whereby the axis of the stator and rotor members may assume angular position in said frame during rotation under load.

2. Apparatus according to claim 1 in which the bearing for supporting the rotor and stator together with the flexible connection are disposed above said rotor and stator, a lower guide bearing for the rotor and a lower flexible connection between said lower bearing and said frame.

3. In combination an inner fixed stator member having a fixed shaft, an outer rotor member having upper and lower walls, a frame surrounding and enclosing said stator and rotor members, said stator shaft extending through said lower wall and into said upper wall and providing a bearing for said rotor, and a flexible connection between said stator shaft and said frame.

In testimony whereof I set my hand.

ROBERT A. BALDWIN.